(12) United States Patent
Bian et al.

(10) Patent No.: US 8,685,547 B2
(45) Date of Patent: Apr. 1, 2014

(54) MAGNETIC RECORDING MEDIA WITH ENHANCED WRITABILITY AND THERMAL STABILITY

(75) Inventors: Bo Bian, Fremont, CA (US); Shoutao Wang, Fremont, CA (US); Weilu Xu, San Jose, CA (US); Abebe Hailu, San Jose, CA (US); Miaogen Lu, Fremont, CA (US); Charles C. Chen, Fremont, CA (US); Thomas Patrick Nolan, Fremont, CA (US); Alexander Yulievich Dobin, Hauppauge, NY (US)

(73) Assignee: Seagate Technology LLC, Scotts Valley, CA (US)

( * ) Notice: Subject to any disclaimer, the term of this patent is extended or adjusted under 35 U.S.C. 154(b) by 244 days.

(21) Appl. No.: 12/389,039

(22) Filed: Feb. 19, 2009

(65) Prior Publication Data

US 2010/0209737 A1      Aug. 19, 2010

(51) Int. Cl.
*G11B 5/66* (2006.01)

(52) U.S. Cl.
USPC ......... 428/827; 428/829; 428/830; 428/836.2

(58) Field of Classification Search
None
See application file for complete search history.

(56) References Cited

U.S. PATENT DOCUMENTS

| | | | |
|---|---|---|---|
| 3,337,075 A | 8/1967 | Stein | |
| 4,576,700 A | 3/1986 | Kadokura et al. | |
| 4,722,869 A | 2/1988 | Honda et al. | |
| 4,780,354 A | 10/1988 | Nakayama et al. | |
| 4,992,338 A | 2/1991 | Hatwar et al. | |
| 5,227,212 A | 7/1993 | Ahlert et al. | |
| 5,290,629 A | 3/1994 | Kobayashi et al. | |
| 5,408,377 A | 4/1995 | Gurney et al. | |
| 5,660,930 A | 8/1997 | Bertero et al. | |
| 5,702,830 A | 12/1997 | Miller et al. | |
| 5,725,963 A | 3/1998 | Iwasaki et al. | |
| 5,736,235 A | 4/1998 | Matsuda et al. | |
| 5,795,663 A | 8/1998 | Koike et al. | |
| 5,830,569 A | 11/1998 | Hikosaka et al. | |
| 5,834,085 A | 11/1998 | Lairson et al. | |
| 5,834,111 A | 11/1998 | Lal et al. | |
| 5,854,727 A | 12/1998 | Tanaka et al. | |
| 5,922,442 A | 7/1999 | Lal et al. | |
| 5,933,297 A | 8/1999 | Hoshiya et al. | |
| 5,976,326 A | 11/1999 | Ranjan et al. | |
| 5,991,125 A | 11/1999 | Iwasaki et al. | |
| 5,995,338 A | 11/1999 | Watanabe et al. | |
| 5,995,341 A | 11/1999 | Tanaka et al. | |
| 6,031,692 A | 2/2000 | Kawawake et al. | |
| 6,077,586 A | 6/2000 | Bian et al. | |

(Continued)

FOREIGN PATENT DOCUMENTS

JP        4-153910        5/1992

*Primary Examiner* — Kevin Bernatz
(74) *Attorney, Agent, or Firm* — Mitchell K. McCarthy (57) ABSTRACT

Aspects are directed to recording media with enhanced magnetic properties for improved writability. Examples can be included or related to methods, systems and components that allow for improved writability while reducing defects so as to obtain uniform magnetic properties such as uniformly high anisotropy and narrow switching field distribution. Some examples include a recording medium with an exchange tuning layer inserted between the hard layer and the soft, semi-soft or thin semi-hard layer so as to maximize the writability improvement of the media. Preferably, the exchange tuning layer is granular and reduces or optimizes the vertical coupling between the hard layer and the soft, semi-soft or semi-hard layer of a magnetic recording or storing device.

20 Claims, 8 Drawing Sheets

(56) References Cited

U.S. PATENT DOCUMENTS

| | | |
|---|---|---|
| 6,146,775 A | 11/2000 | Fujita et al. |
| 6,174,597 B1 | 1/2001 | Yusu et al. |
| 6,177,208 B1 | 1/2001 | Yamamoto et al. |
| 6,221,508 B1 | 4/2001 | Kanbe et al. |
| 6,242,085 B1 | 6/2001 | Ryonai et al. |
| 6,280,813 B1 | 8/2001 | Carey et al. |
| 6,395,413 B1 | 5/2002 | Ando |
| 6,420,058 B1 | 7/2002 | Haratani et al. |
| 6,468,670 B1 | 10/2002 | Ikeda et al. |
| 6,531,202 B1 | 3/2003 | Khizroev et al. |
| 6,562,453 B1 | 5/2003 | Futamoto et al. |
| 6,686,070 B1 | 2/2004 | Futamoto et al. |
| 6,699,600 B2 | 3/2004 | Shimizu et al. |
| 6,777,112 B1 | 8/2004 | Girt et al. |
| 6,914,749 B2 | 7/2005 | Chang et al. |
| 7,060,376 B1 | 6/2006 | Chang et al. |
| 7,192,664 B1 | 3/2007 | Wu et al. |
| 7,201,977 B2 | 4/2007 | Li et al. |
| 7,582,368 B2 * | 9/2009 | Berger et al. ............. 428/827 |
| 7,892,663 B2 * | 2/2011 | Nakagawa et al. ............ 428/829 |
| 8,507,114 B2 * | 8/2013 | Peng et al. .................... 428/827 |
| 2001/0031382 A1 | 10/2001 | Kusakawa et al. |
| 2001/0038932 A1 | 11/2001 | Uwazumi et al. |
| 2002/0034666 A1 | 3/2002 | Kiely |
| 2002/0048693 A1 | 4/2002 | Tanahashi et al. |
| 2002/0071208 A1 | 6/2002 | Batra et al. |
| 2002/0187368 A1 | 12/2002 | Senzaki et al. |
| 2003/0091868 A1 | 5/2003 | Shimizu et al. |
| 2003/0104247 A1 | 6/2003 | Girt |
| 2003/0108776 A1 | 6/2003 | Chang et al. |
| 2003/0148143 A1 | 8/2003 | Kanbe et al. |
| 2006/0024530 A1 | 2/2006 | Nolan |
| 2006/0177703 A1 * | 8/2006 | Takenoiri et al. ............. 428/829 |
| 2006/0269797 A1 | 11/2006 | Lu et al. |
| 2007/0064345 A1 | 3/2007 | Nolan et al. |
| 2007/0072011 A1 * | 3/2007 | Li et al. ..................... 428/828.1 |
| 2007/0212574 A1 * | 9/2007 | Berger et al. ................. 428/828 |
| 2007/0287031 A1 | 12/2007 | Nolan et al. |
| 2008/0199735 A1 * | 8/2008 | Berger et al. ............. 428/828.1 |
| 2009/0073599 A1 * | 3/2009 | Nemoto et al. ............ 360/77.02 |
| 2009/0081484 A1 * | 3/2009 | Watanabe .................... 428/828 |

* cited by examiner

MAGNETIC RECORDING MEDIA WITH ENHANCED WRITABILITY AND THERMAL STABILITY

RELATED APPLICATIONS

The following subject matter is related to U.S. Patent Publication Nos. 20060024530, 20060269797, 20070064345, and 20070287031, and to U.S. Pat. Nos. 6,777,112, 7,192,664, 6,914,749, and 7,201,977, each of which is incorporated by reference in its entirety and for all purposes herein.

BACKGROUND

1. Field

This invention is directed to recording media with enhanced magnetic properties for improved writability. In particular, the invention is directed to methods, systems and components that allow for improved writability while reducing defects so as to obtain uniform magnetic properties such as uniformly high anisotropy (Hk) and narrow switching field distribution (SFD).

2. Related Art

Magnetic media are widely used in various applications, particularly in the computer industry for data/information storage and retrieval applications, typically in disk form, and efforts are continually made with the aim of increasing the areal recording density, i.e., bit density or bits/unit area of the magnetic media. Conventional thin-film type magnetic media, wherein a fine-grained polycrystalline magnetic alloy layer serves as the active recording layer, are generally classified as "longitudinal" or "perpendicular" depending upon the orientation of the magnetic domains of the grains of magnetic material.

Typically, recording media are fabricated with polycrystalline CoCr or CoPt-oxide containing films. Co-rich areas in the polycrystalline film are ferromagnetic while Cr or oxide rich areas in the film are non-magnetic. Magnetic interaction between adjacent ferromagnetic domains is attenuated by nonmagnetic areas in between.

A conventional longitudinal recording, hard disk-type magnetic recording medium commonly employed in computer-related applications comprises a substantially rigid, non-magnetic substrate, typically of aluminum (Al) or an aluminum-based alloy, such as an aluminum-magnesium (Al—Mg) alloy, and a sequentially deposited or otherwise formed on a surface thereof a plating layer, such as of amorphous nickel-phosphorus (Ni—P); a bi-layer comprised of a seed layer of an amorphous or fine-grained material, e.g., a nickel-aluminum (Ni—Al) or chromium-titanium (Cr—Ti) alloy, and a polycrystalline underlayer typically of Cr or a Cr-based alloy; a magnetic recording layer, e.g., of a cobalt (Co)-based alloy with one or more of platinum (Pt), Cr, boron (B), etc.; a protective overcoat layer typically containing carbon (C), e.g., diamond-like carbon ("DLC"); and a lubricant topcoat layer, e.g., of a perfluoropolyether. Each of the substrate, plating layer, seed layer, interlayer, magnetic layer or overcoat may be deposited by suitable physical vapor deposition ("PVD") techniques, such as sputtering, and the lubricant topcoat is typically deposited by dipping or spraying. A carbon overcoat is typically deposited in argon with nitrogen, hydrogen or ethylene. The protective overcoat protects the magnetic recording layer from corrosion and reduces frictional forces between the disc and a read/write head. The thin layer of lubricant may be applied to the surface of the protective overcoat to enhance the tribological performance of the head-disc interface by reducing friction and wear of the protective overcoat.

In operation of a longitudinal medium, the magnetic layer is preferably locally magnetized by a write transducer, or write "head", to record and thereby store data/information therein. The write transducer or head can comprise a main (writing) pole as well as auxiliary poles and creates a highly concentrated magnetic field which alternates the media magnetization direction based on the bits of information to be stored. When the local magnetic field produced by the write transducer is greater than the coercivity of the material of the recording medium layer, the grains of the polycrystalline material at that location are magnetized. The grains retain their magnetization after the magnetic field applied thereto by the write transducer is removed. The direction of the magnetization matches the direction of the applied magnetic field. The magnetization of the recording medium layer can subsequently produce an electrical response in a read transducer, or read "head", allowing the stored information to be read.

Efforts are continually being made with the aim of increasing the recording areal density and signal-to-medium noise ratio ("SMNR") of the magnetic media. In this regard, so-called perpendicular recording media (recording media with a perpendicular anisotropy in the magnetic layer and magnetization forming in a direction perpendicular to the surface of the magnetic layers) have been found to be superior to the more conventional longitudinal media in achieving very high bit densities without experiencing the thermal stability limit associated with the latter. In perpendicular magnetic recording media, residual magnetization is formed in a direction ("easy axis") perpendicular to the surface of the magnetic medium, typically a layer of a magnetic material on a suitable substrate.

Very high linear recording densities are obtainable by utilizing a "single-pole" magnetic transducer or "head" with perpendicular magnetic media. A typical perpendicular recording system utilizes a magnetic medium with a relatively thick (as compared with the magnetic recording layer) "soft" magnetic underlayer (SUL), a relatively thin "hard" perpendicular magnetic recording layer, and a single-pole head. Magnetic "softness" refers to a magnetic material having a relatively low coercivity below about 150 oersteds (Oe) or preferably below about 10 Oe, such as of a NiFe alloy (Permalloy) or a material that is easily magnetized and demagnetized. The magnetically "hard" recording layer has a relatively high coercivity of several kOe, typically about 2-10 kOe or preferably about 3-8 kOe, and comprises, for example, a cobalt-based alloy (e.g., a Co—Cr alloy such as CoCrPtB, or another material that neither magnetizes nor demagnetizes easily) having perpendicular anisotropy. The magnetically soft underlayer serves to guide magnetic flux emanating from the head through the hard, perpendicular magnetic recording layer. The system further preferably comprises a non-magnetic substrate, at least one non-magnetic interlayer, and an optional adhesion layer. The relatively thin interlayer comprised of one or more layers of non-magnetic materials, is preferably positioned below the at least one magnetically hard recording layer, and serves to prevent magnetic interaction between the soft underlayer and the magnetically hard recording layer and promote desired microstructural and magnetic properties of the hard recording layer. See US Publication No. 20070287031; U.S. Pat. No. 6,914,749; U.S. Pat. No. 7,201,977. The interlayer may comprise multiple layers forming an interlayer stack, with at least one of these layers preferably including an hcp (hexagonally close packed) material adjacent to the magnetically hard perpendicular recording layer.

Magnetic flux φ, emanates from the main writing pole of a magnetic transducer head, enters and passes through the at least one vertically oriented, magnetically hard recording layer in the region below the main pole, enters and travels within the SUL for a distance, and then exits therefrom and passes through the at least one perpendicular hard magnetic recording layer in the region below an auxiliary pole of the transducer head.

Granular perpendicular magnetic recording media is being developed for its capability of further extending the areal density of stored data, as compared to conventional perpendicular media, which is limited by the existence of strong lateral exchange coupling between magnetic grains. A granular (meaning that the in-plane grains are discontinuous in nature) perpendicular recording medium comprises a "hard" granular perpendicular magnetic layer having magnetic columnar grains separated by grain boundaries comprising voids, oxides, nitrides, non-magnetic materials, or combinations thereof. The grain boundaries, having a thickness of about 2 to about 20 angstroms, provide a substantial reduction in the magnetic interaction between the magnetic grains. In contrast to conventional perpendicular media, wherein the perpendicular magnetic layer is typically sputtered at low pressures and high temperatures in the presence of an inert gas, such as argon (Ar), deposition of the granular perpendicular magnetic layer is conducted at relatively high pressures and low temperatures and may utilize a reactive sputtering technique wherein oxygen (O) and/or nitrogen (N) containing molecules are introduced in a gas mixture of, for example, Ar and $O_2$, Ar and $N_2$, or Ar and $O_2$ and $N_2$, and $H_2O$. Alternatively, oxides and/or nitrides may be introduced by utilizing a sputter target comprising oxides and/or nitrides, which is sputtered in the presence of an inert gas (e.g., Ar), or, optionally, may be sputtered in the presence of a sputtering gas comprising O and/or N with or without the presence of an inert gas. The introduced oxides and/or nitrides migrate into the grain boundaries and can provide for a granular perpendicular structure having a reduced lateral exchange coupling between grains. See US Publication No. 20060269797. The introduction of such grain boundaries can increase the areal density of recording/storing media.

The various layers within a medium described herein forms a stacked structure. The polycrystalline layers of the layer stack of the medium contain grain boundaries. Since a magnetically hard main recording layer and interlayer commonly comprise crystalline materials, and the hard magnetic layer is preferably grown coherently on the interlayer, grains of each polycrystalline layer are of substantially the same width (as measured in a horizontal direction) and in vertical registry (i.e., vertically "correlated" or aligned). Completing the layer stack is a protective overcoat layer, such as of a diamond-like carbon (DLC), formed over the hard magnetic layer, and a lubricant topcoat layer, such as of a perfluoropolyether material, formed over the protective overcoat layer. The perpendicular recording medium may also comprise a plating layer and/or a seed layer as described in the longitudinal recording medium configuration. The seed layer is preferably adjacent to the magnetically soft underlayer (SUL) and preferably comprises at least one of an amorphous material and a face-centered-cubic lattice structure (fcc) material. The term "amorphous" means that such a material exhibits no sharp peak in a theta-2theta X-ray diffraction pattern as compared to background noise. Amorphous layers may encompass nanocrystallites in amorphous phase or any other form of a material so long the material exhibits no peak in an X-ray diffraction pattern as compared to background noise. A seed layer seeds the nucleation of a particular crystallographic texture of the underlayer. Conventionally, a seed layer is the first deposited layer on the non-magnetic substrate. The role of this layer is to texture or align the crystallographic orientation of the subsequent Cr-containing underlayer. The seed layer, underlayer, and magnetic layer are conventionally sequentially sputter deposited on the substrate in an inert gas atmosphere, such as an atmosphere of argon.

Very fine-grained magnetic recording media may possess thermal instability. One solution is to provide stabilization via coupling of the ferromagnetic recording layer with another ferromagnetic layer or an anti-ferromagnetic layer. This can be achieved by providing a stabilized magnetic recording medium comprised of at least a pair of ferromagnetic layers which are anti-ferromagnetically-coupled ("AFC"). U.S. Pat. No. 6,777,112 is directed to interposing a non-magnetic spacer layer between AFC magnetic layers; however, interplanar exchange coupling between grains of the recording medium layers has not been optimally controlled by prior art structures, and magnetic cluster size has not been reduced without sacrificing the thermal stability of the recording medium.

One configuration of a recording medium containing AFC-coupled recording layers comprises a continuous magnetic recording layer vertically stacked over a "hard" granular magnetic recording layer. The magnetic grains of the continuous layer are laterally more strongly exchange coupled while the magnetic grains of the hard granular layer are only weakly exchange coupled laterally. The continuous layer (often comprising a material having a relatively low coercivity or a material that is more easily magnetized and demagnetized) is ferromagnetically coupled to the hard granular layer (comprising a material having a relatively high coercivity or a material that neither magnetizes nor demagnetizes easily) in certain recording medium configurations. In such media, the entire continuous magnetic layer may couple with each grain in the granular hard magnetic layer underneath (forming a vertically exchange coupled composite—"ECC"). See U.S. Pat. No. 7,201,977.

The substrate is typically disk-shaped and may comprise glass, ceramic, glass-ceramic, NiP/aluminum, metal alloys, plastic/polymer material, ceramic, glass-polymer, composite materials non-magnetic materials, or a combination or a laminate thereof. See U.S. Pat. No. 7,060,376. A substrate material conventionally employed in producing magnetic recording rigid disks comprises an aluminum-magnesium (Al—Mg) alloy. Such Al—Mg alloys are typically electrolessly plated with a layer of NiP at a thickness of about 15 microns to increase the hardness of the substrates, thereby providing a suitable surface for polishing to provide the requisite surface roughness or texture. The optional adhesion layer, if present on the substrate surface, typically comprises a less than about 200 angstroms (Å) thick layer of a metal or a metal alloy material such as Ti, a Ti-based alloy, Ta, a Ta-based alloy, Cr, or a Cr-based alloy.

The relatively thick SUL is typically comprised of an about 30 to about 300 nm thick layer of a soft magnetic material such as Ni, Co, Fe, an Fe-containing alloy such as NiFe (Permalloy), FeN, FeSiAl, FeSiAlN, a Co-containing alloy such as CoZr, CoZrCr, CoZrNb, or a Co—Fe-containing alloy such as CoFeZrNb, CoFe, FeCoB, and FeCoC. The relatively thin interlayer stack typically comprises an about 50 to about 300 Å thick layer or layers of non-magnetic material(s). The interlayer stack includes at least one interlayer of an hcp material, such as Ru, TiCr, Ru/CoCr$_{37}$Pt$_6$, RuCr/CoCrPt, etc., adjacent the magnetically hard perpendicular recording layer. When present, a seed layer adjacent the SUL may typically include a less than about 100 Å thick layer of an fcc material, such as an alloy of Cu, Ag, Pt, or Au, or an amorphous or fine-grained material, such as Ta, TaW, CrTa, Ti, TiN, TiW, or TiCr. The at least one magnetically hard perpendicular recording layer is typically comprised of an about 10 to about 25 nm thick layer(s) of Co-based alloy(s) including one or more elements selected from the group consisting of Cr, Fe, Ta, Ni, Mo, Pt, W, Cr, Ru, Ti, Si, O, V, Nb, Ge, B, and Pd.

Of the conventional media types described above, longitudinal media are more developed than perpendicular media and have been utilized for several decades in the computer industry. During this interval, components and sub-systems, such as transducer heads, channels, and media, have been repeatedly optimized in order to operate efficiently within computer environments. However, it is a common current belief that longitudinal recording is reaching the end of its lifetime as an industry standard in computer applications owing to physical limits which effectively prevent further increases in areal recording density.

Perpendicular media, on the other hand, have replaced longitudinal media in many computer-related recording applications and continue the movement toward ever-increasing areal recording densities far beyond the capability of longitudinal media. However, perpendicular media and recording technology is less well developed than all facets of longitudinal media and recording technology. Specifically, each individual component of perpendicular magnetic recording technology, including transducer heads, media, and recording channels, is less completely developed and optimized than the corresponding component of longitudinal recording technology. As a consequence, the gains observed with perpendicular media and systems vis-à-vis the prior art, i.e., longitudinal media and systems, are difficult to assess.

High density perpendicular recording media require careful control and balance of several magnetic properties including: high enough anisotropy to enable thermal stability and compatibility with a high gradient head; low enough switching field to enable writability by the head; lateral exchange coupling low enough to maintain small correlation length between magnetic grains or clusters and high enough to maintain a narrow switching field distribution (SFD); and grain-to-grain uniformity of magnetic properties sufficient to maintain thermal stability and minimize SFD.

As recording density continues to increase, it is necessary to make smaller grain structures to maintain the number of magnetic particles in a bit at a similar value. Smaller grain structures are more sensitive to non-uniformities such as anisotropy variations within grains, and also require higher anisotropy to maintain thermal stability, thus adversely affecting writability. Therefore, there is a need in the art for a media with improved writability and fewer defects for narrower SFD and improved uniformity of properties.

Some current perpendicular recording media employ a recording layer including three or more Co-alloy magnetic layers to optimize magnetic parameters. For example U.S. Pat. No. 7,192,664 describes a first or bottom magnetic layer with a composition such as $CoCr_{4-20}Pt_{12-25}(TiO_2)_{4-12}$ that includes a fairly high oxide volume percentage for low Hex and a fairly high Pt concentration for high anisotropy. Other layers (for example, upper magnetic layers) may have lower oxide and Pt concentrations, and may contain other elements, e.g., B so as to tune exchange coupling, reduce SFD, and improve writability. See US Publication No. 20070064345. However, elements such as Pt and B can also introduce defects such as stacking faults that can degrade uniformity of properties such as anisotropy and limit the reduction of SFD, the narrowing of magnetic transitions, and the improvement of media signal-to-noise ratio (SNR). US Publication No. 20060024530.

In view of the foregoing, there exists a clear need for improved recording media, particularly perpendicular recording media, and system technology which are designed to functionally provide a range of benefits and performance enhancements as compared to conventional recording media and systems.

SUMMARY

Aspects disclosed herein can overcome several problems and disadvantages associated with existing magnetic recording layer structures in order to improve writability while reducing defects so as to obtain more uniform magnetic properties such as uniformly high anisotropy ($H_k$) and narrow switching field distribution (SFD). Embodiments of the invention are directed to magnetic recording media that can include perpendicular recording media, longitudinal recording media, discrete track recording media, bit patterned media, filter media, or heat assisted magnetic recording (HAMR) media.

One embodiment is directed to a magnetic recording medium comprising: a first magnetic recording layer comprising one or more granular magnetic layers, wherein this first magnetic recording layer has an anisotropy field of about 10 kOe or more (this first magnetic recording layer is also referred to throughout as a "hard," and/or "granular" and/or "bottom" magnetic recording layer); a second magnetic recording layer comprising one or more continuous magnetic layers, wherein this second magnetic recording layer has a lower anisotropy field than that of the first magnetic recording layer (this second magnetic recording layer is referred to throughout as either a "soft," "semi-soft," "semi-hard," "second," "continuous" or "top" magnetic recording layer); and a vertical exchange coupling (or exchange break) "exchange tuning layer" between the first and second magnetic recording layers. Preferably, the exchange tuning layer comprises at least one granular layer, and preferably, the exchange tuning layer comprises one or more magnetic layers. Preferably, the overall magnetic recording medium exhibits a coercivity of about 3-7 kOe. In one embodiment, the second (soft/semi-soft/semi-hard) magnetic recording layer comprises a granular layer proximate to the higher anisotropy layer below, and a continuous layer above the granular layer. Preferably, the second (soft/semi-soft/semi-hard) magnetic recording layer contains platinum (Pt) in a lower concentration than does the first (hard) magnetic recording layer. Preferably, the second magnetic recording layer has an anisotropy field of about 6-12 kOe.

The exchange tuning layer preferably comprises cobalt, a cobalt-alloy, platinum, boron, ruthenium, chromium, tantalum, a hexagonally close packed (hcp) material, an oxide, a non-magnetic Co-oxide-Ru, a Ru-oxide granular material, $CoCr_{0-20}Ru_{2-25}(TiO_2)_{4-12}$, $CoCr_{0-20}Ru_{2-40}(SiO_2)_{2-8}$, or combinations thereof. The exchange tuning layer may be magnetic or may have a low magnetization or be non-magnetic. Preferably, the exchange tuning layer comprises granular material or at least one or more granular layers and has a thickness of about 0.1-100 angstroms, about 1-50 angstroms, about 1-40 angstroms, about 10-80 angstroms, about 10-25 angstroms, or about 15 angstroms, and a preferable saturation magnetization ($M_s$) of about 0-100 emu/cc, about 100-300 emu/cc, or about 0-300 emu/cc. Preferably, the exchange tuning layer is weakly magnetic, and preferably it has a magnetic moment of about 200 memu/cc or less.

Another embodiment is directed to an exchange tuning layer that reduces vertical coupling between the first and second magnetic recording layers, or methods for reducing such vertical coupling. Preferably, a recording medium according to embodiments of the invention has a smaller switching field distribution (SFD) as compared to a medium with no exchange tuning layer. One embodiment is directed to a method for reducing the SFD of a recording medium by introducing an exchange tuning layer. Preferably, a recording medium according to embodiments of the invention has a bit error rate (BER) gain of between about 0.3 and 1, or between about 0.3 and 0.5 decade greater than a medium with no exchange tuning layer.

Preferably, the recording medium according to embodiments of this invention exhibits a remanent coercivity of about 1-7000 Oe, about 1-5000 Oe, about 1-1000 Oe, about 3000-5000 Oe, about 3000-7000 Oe, about 4000-5000 Oe or about 4000-45000 Oe.

Another embodiment is directed to a method of manufacturing a magnetic recording medium, the method comprising: depositing a soft magnetic underlayer (SUL) on a substrate; depositing a first magnetic recording layer having an anisotropy field of about 10 kOe or more over the SUL, wherein said first magnetic recording layer comprises one or more granular magnetic layers; depositing an exchange tuning layer over the first magnetic layer, wherein the exchange tuning layer has a thickness of about 0-100 angstroms and comprises at least one granular magnetic layer; and depositing a second magnetic recording layer having an anisotropy field that is lower that of the first magnetic recording layer over the exchange tuning layer, wherein said second magnetic layer comprises one or more continuous magnetic layers. Preferably, the second magnetic recording layer has an anisotropy field of about 15 kOe or less, or of about 12 kOe or less.

Another embodiment is directed to a method wherein increasing the thickness of the exchange tuning layer increases saturation magnetization ($M_s$) of the exchange tuning layer.

Another embodiment is directed to a magnetic recording medium manufactured by the method according to embodiments of the invention.

Other embodiments and advantages of the invention are set forth in part in the description, which follows, and in part, may be obvious from this description, or may be learned from the practice of the invention.

DETAILED DESCRIPTION

Exchange coupled composite (ECC) microstructures can improve the writability of high anisotropy magnetic layers. An ECC structure comprises at least one relatively high anisotropy layer and at least one lower anisotropy layer which are vertically exchange-coupled through the interface between the layers. It is known from modeling and other applications, such as high energy product magnetic materials, that very high anisotropy "hard" layers strongly exchange-coupled to low anisotropy "soft" layers can significantly reduce the field needed to switch or "write" the hard layer while maintaining high thermal stability. However, most Co-alloys typically used in hard layers limit the anisotropy of a layer to below 30 kOe (kilo-Oersteds), and in many commonly employed Co-alloys to below about 20 kOe. Further, it is desirable that the average anisotropy of all layers be relatively high, to be compatible with recording heads and to maintain thermal stability. Thus, the soft layer(s) employed in the prior art in such AFC magnetic recording layers have been limited to relatively thin layers having relatively high anisotropy (in other words, the "soft" layers are, in essence, "semi-soft" or "semi-hard" because of their relatively high anisotropy as compared to typical "soft" layers), so that the average anisotropy of the combined layers can be maintained sufficiently high.

Figure 1:
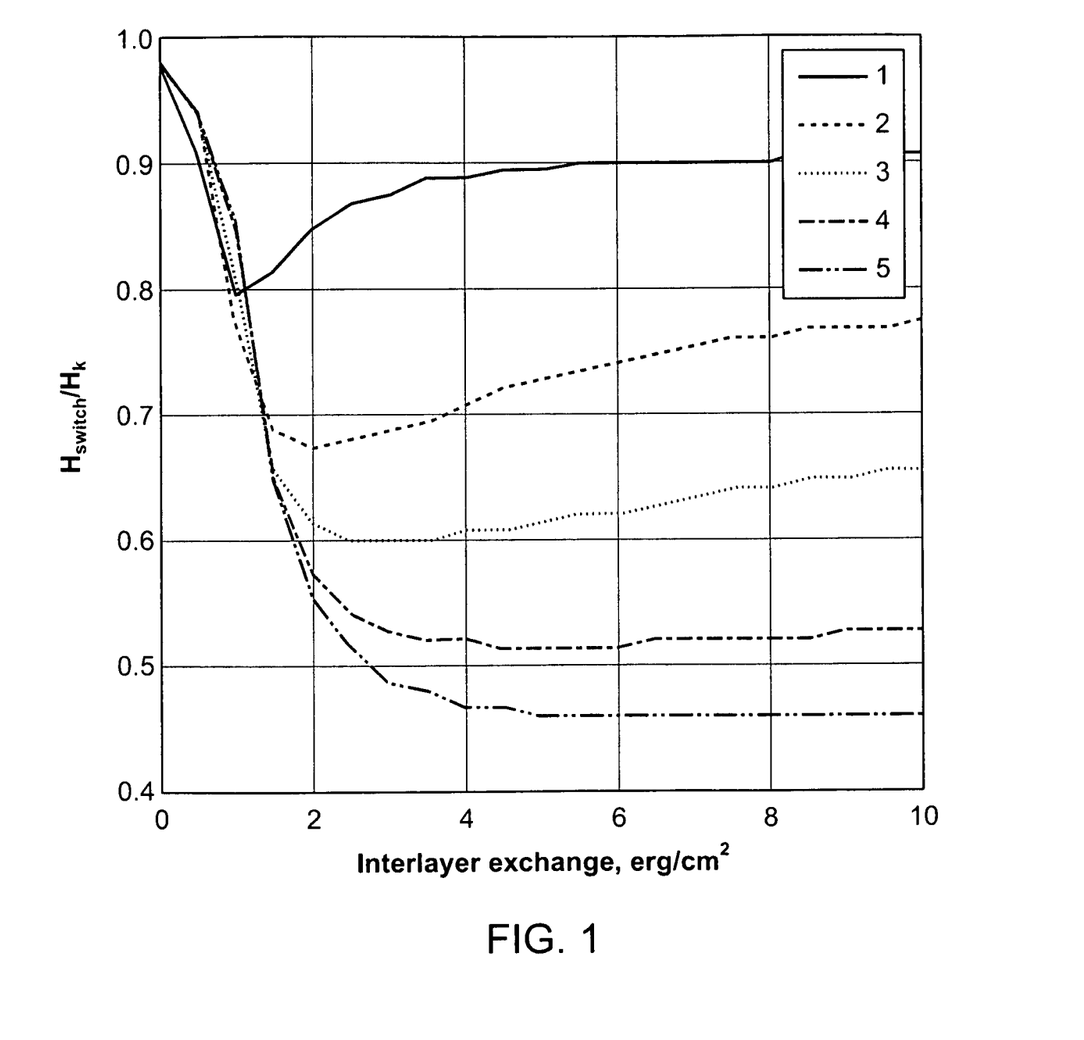
FIG. 1 shows the interaction between soft layer thickness, switch anisotropy values, and vertical coupling between hard and soft layers of a magnetic recording medium.

However, this arrangement—made up of strongly vertically coupled hard and soft layers in which the "soft" layer's anisotropy is increased and its thickness decreased (resulting in a thin semi-hard layer)—leads to decreased writability. FIG. 1 shows the interaction between "soft" layers of five different thicknesses (between 1 nm and 5 nm) and switch anisotropy ($H_{switch}$) over the anisotropy field ($H_k$). The saturation magnetization ($M_s$) is maintained at 700 emu/cc for each of the "soft" layers in this experiment.

The progressively thinner soft layers are shown as having respectively increased switch anisotropies and thus decreasing the writability of the recording system. At the same time, writability of a hard layer coupled to thin semi-hard layers is improved by a reduction in the vertical coupling between the layers. As shown in FIG. 1, optimal vertical coupling strength for maximum write enhancement varies with soft/semi-soft/semi-hard layer anisotropy and thickness ($t_{soft}$, measured in nanometers), decreasing as either of these values increases.

The dependence of the coercivity on vertical coupling is a complex phenomenon caused by the domain wall de-pinning at the soft/hard layers interface. The lines of FIG. 1 depict the dependence of remanent coercivity (or switching field) on vertical (or interlayer exchange) coupling (lines of thicknesses from 1 nm to 5 nm, as labeled in the legend). A lower coercivity is typically desired for optimum magnetic recording performance. The different lines in FIG. 1 correspond to different thickness of the "soft" (top) magnetic recording layer (see the legend on the plot). From FIG. 1, it can be seen that the minimum coercivity is achieved at different values of inter-layer coupling for different thicknesses of the soft magnetic recording layer. In this example, where the soft layer is 5 nm thick, there is no "minimum" coercivity value at a specific interlayer exchange value, but rather, coercivity is steadily maintained at a low value at larger interlayer exchange values (coupling). Therefore, no intermediate layer is necessary for thick soft magnetic layers, such as the 5 nm thick layer of the example depicted in FIG. 1. On the other hand, for a thin soft layer (for example, the 2 nm-thick layer in FIG. 1), coercivity achieves a minimum at a low value of vertical coupling (in this case, 2 erg/cm$^2$).

It was surprisingly discovered that by engineering an intermediate layer between the hard and the lower anisotropy magnetic recording layers of a magnetic recording medium, vertical coupling could be adjusted to achieve optimal coercivity.

One embodiment of the present invention comprises a vertical exchange coupling tuning layer ("exchange tuning layer") that is inserted between the at least one hard layer and the at least one soft, semi-soft or semi-hard layer to improve or enhance writability of recording and/or storing media. The exchange tuning layer preferably comprises one or more granular and magnetic layers. The exchange tuning layer increases the effective volume of each of the magnetic grains while maintaining their relatively small actual physical magnetic cluster size throughout the magnetic recording stack. The exchange tuning layer therefore increases the thermal stability of the recording layer stack by optimizing the coupling strength between the ferromagnetic layer pairs. The preferably granular nature of the exchange tuning layer also allows this exchange tuning layer to be grown over the hard magnetic recording layer which preferably comprises at least one granular magnetic layer.

The exchange tuning layer according to embodiments of this invention optimizes coupling between AFC hard and soft/semi-soft/semi-hard magnetic recording layers as a function of the exchange tuning layer's thickness. Without wishing to be bound by theory, writability can be expressed as a function of the saturation magnetization ($M_s$) field: when there is no exchange tuning layer between the hard and soft/semi-soft/semi-hard magnetic recording layers, the saturation field can be so high as to make the media not writable. When an exchange tuning layer according to embodiments of the invention is introduced, the saturation field starts to be reduced and reach an optimal point for significantly improving writability. However, care should be taken not to increase the thickness of the exchange tuning layer to the point of isolating the tow magnetic recording layers. Such isolation between the magnetic recording layers compromises the magnetic structure of a magnetic recording device and does not allow the magnetic field emanated from a magnetic writer head to penetrate through the soft/semi-soft/semi-hard layer to reach the hard layer and record onto the magnetic layer stack (comprising the two magnetic recording layers, and the exchange tuning layer).

The hard magnetic recording layer may be deposited proximally or distally to the substrate; the soft/semi-soft/semi-hard magnetic recording layer may be deposited proximally or distally to the substrate. "Bottom" and "top," as used herein to describe the positioning of the stacked magnetic recording layers of recording media, refer to "proximate" versus "distal" to the substrate, respectively. Preferably, the hard layer is the bottom (or proximate to the substrate) magnetic layer in the medium configuration, while the soft/semi-soft/semi-hard layer with a relatively lower anisotropy than the hard layer is preferably deposited distally to the substrate. Preferably, the soft/semi-soft/semi-hard layer is deposited over the exchange tuning layer.

Preferably, the hard magnetic recording layer comprises a Co-alloy with an oxide for reduction of lateral exchange coupling and comprises at least one granular magnetic layer. Exchange coupling is preferably controlled by forming non-ferromagnetic material at the boundaries between magnetic particles. Non-ferromagnetic material is commonly formed during sputter deposition of CoPtCrB containing alloys on high temperature substrates by preferential surface diffusion of Cr and B to grain boundaries. The Co concentration varies between the grain center and the grain boundary such that there is a transition from magnetic to non-magnetic composition. Exchange coupling in such media is controlled by changing parameters such as the Cr and B concentrations, and the substrate temperature. Non-ferromagnetic material can also be formed at magnetic grain boundaries during sputter deposition of CoPt containing alloys on low temperature substrates, by addition of a metal oxide to the sputter target or by reactively sputtering the target in a sputter gas containing oxygen. Exchange coupling in these media is controlled by changing parameters such as sputter gas pressure, oxygen concentration in the sputter gas, and oxide concentration in the sputter target. In accordance with one embodiment of the present invention, about 50% to about 100% of the total amount of $TiO_2$ present in the magnetic alloy layer is segregated at the grain boundaries, or substantially all of the $TiO_2$ present is segregated at the grain boundaries.

Co-alloy hard layers enable an anisotropy in the range of about 12-24 kOe. Preferably, the hard layer comprises a multilayer structure such as alternating (preferably thin) layers of a Co-alloy and a Pt-alloy or a Pd-alloy and preferably enables anisotropy of at least about 20 kOe and above. Laterally exchange-decoupled microstructures limit anisotropy to at or below 40 kOe. Preferably, a multilayer structure coupled with an exchange tuning layer according to embodiments of this invention enables optimization of anisotropy. In one embodiment, the high coercivity (hard) magnetic materials employed can also comprise CoCr, CoCrPt, CoCrTa, CoCrTaPt, CoPt, CoNiCr, CoCrPtB, an FePt alloy or combinations thereof. In another embodiment, the hard magnetic recording layer has an $M_s$ of about 2 or more Tesla (T).

In one embodiment, the at least one hard magnetic recording layer comprises about 50 to about 250 Å thick layer(s) of Co-based alloy(s) including one or more elements selected from the group consisting of Cr, Fe, Ta, Ni, Mo, Pt, V, W, Nb, Ge, B, and Pd, iron nitrides or oxides. In another embodiment, the hard magnetic recording layer comprises a (CoX/Pd or Pt)$_n$ multilayer magnetic super-lattice structure, where n is an integer from about 10 to about 25, where each of the alternating thin layers of Co-based magnetic alloy of the super-lattice is from about 2 to about 3.5 Å thick, where X is an element selected from the group consisting of Cr, Ta, B, Mo, Pt, W, and Fe, and where each of the alternating thin, non-magnetic layers of Pd or Pt is up to about 10 Å thick. Embodiments of the present invention include magnetic recording media containing a magnetic alloy having a Pt content of 10 to 30 at. %, e.g., 15 to 25 at. %, and 3 to 8 at. % $TiO_2$.

A practical magnetic recording layer having an anisotropy that is lower than that of the hard granular layer has a thickness of about 15 nm. For a high average anisotropy of the combined layers to be maintained, this magnetic layer's anisotropy is maintained fairly high (as compared to typical magnetically "soft" layers), such as about 6-12 kOe, thus designating it as semi-soft or semi-hard. When such a semi-soft or semi-hard magnetic recording layer is as thin as between about 1 and 2 nm, low or even negative values of perpendicular anisotropy ($H_k$) are functional. There are different combinations of ranges of soft/semi-soft/semi-hard magnetic recording layer properties, including perpendicular anisotropy in the range of about −6000 to +12,000 Oe and a thickness of about 1-15 nm, and a wide range of vertical coupling values for optimization of writability. In one embodiment, the magnetic material employed in this soft, semi-soft or semi-hard magnetic recording layer comprises a NiFe alloy. In another embodiment, this layer has a saturation magnetization ($M_s$) of less than about 2 T, less than about 1.5 T, less than about 1 T, or less than about 0.5 T.

Preferably, the exchange tuning layer provides a wide range of coupling strength while maintaining desired top (hard) layer properties such as orientation, lateral exchange coupling, uniformity and desirable anisotropy values. Preferably, the hexagonally close packed (hcp) structure in the medium is stabilized, crystal growth orientation and film morphology are maintained, and primary vertical coupling control is provided by the medium structures according to embodiments of this invention.

In one embodiment, the exchange tuning layer has a thickness of about 0-4 nm and comprises a Co-alloy with a low saturation magnetization ($M_s$) of about 0-100 emu/cc. Preferably, the exchange tuning layer enables optimization of remanence coercivity (HCR), vertical exchange coupling, closure fields, and writability. In another embodiment, the exchange tuning layer comprises an alloy having an $M_s$ of about 100-300 emu/cc and a greater thickness (of about 1-8 nm) to span a similar coupling range. More preferably, the exchange tuning layer further comprises the addition of Ru for hcp structure stabilization and reduction of $M_s$. More preferably, the exchange tuning layer comprises an oxide to enable maintenance of low lateral exchange coupling in the tuning and/or subsequently deposited layer(s). In another embodiment, the exchange tuning layer comprises a Co-alloy with the addition of Pt or B, as well as Ru, for hcp structure stabilization and reduction of $M_s$. In other embodiments, the exchange tuning layer comprises nonmagnetic layers, and may comprise hcp materials that do not include Co.

The medium preferably further includes a soft magnetic underlayer formed on the substrate and may comprise a plurality of layers. The soft magnetic underlayer preferably comprises Ni, Fe, a Fe-alloy, a Cr-doped Fe-alloy-containing alloy, CoFeZr, CoFeTa, FeCoZrB, NiFe (Permalloy), Co, CoZr, CoZrCr, CoZrNb, CoFeZrNb, CoFe, Fe, FeN, FeSiAl, FeSiAlN, FeCoB, FeCoC, or combinations thereof. The SUL is preferably formed at a thickness of 500 Å to 4000 Å. Preferably, an interlayer is positioned on the soft underlayer. A hard magnetic recording layer is preferably positioned on the interlayer. The hard magnetic recording layer preferably includes a plurality of grains of magnetic material and a plurality of boundaries of non-magnetic material, such as oxides, nitrides, or other non-magnetic material, that separate the grains of magnetic material. The grains can have a size in the range of 3-10 nm, and the oxide containing magnetic layer can have a thickness in the range of 3-20 nm.

The layers of the structure can be comprised of various materials. Substrate materials generally include NiP-plated Al alloy, glass, glass-ceramic, ceramic, or other non-magnetic materials. The substrate may also be a textured substrate, such as a conventionally NiP-plated textured aluminum substrate or a textured glass-ceramic substrate. Adhesion enhancement layer materials include tantalum (Ta), titanium (Ti), titanium-chromium (TiCr), chromium (Cr) and other metals.

The at least one hard magnetic recording layer preferably has an anisotropy of greater than 12 kOe, greater than 15 kOe, or preferably 15-40 kOe, and preferably comprises Co, Ti, Pd, Cu, Cr, Fe, Ta, Ni, Mo, Pt, V, W, Nb, Ge, B, alloys, or combinations thereof. More preferably, the hard magnetic recording layer comprises Co-based alloys comprising oxides and nitrides, for example cobalt-platinum oxides (CoPtO), cobalt-chromium-platinum oxides (CoCrPtO), cobalt-chromium-platinum-tantalum oxides CoCrPtTaO, cobalt-platinum-titanium oxides (CoPtTiO), cobalt-chromium-platinum-titanium oxides (CoCrPtTiO), cobalt-chromium-platinum-aluminum oxides (CoCrPtAlO), cobalt-platinum-silicon oxides (CoPtSiO), cobalt-chromium-platinum-zirconium oxides (CoCrPtZrO), cobalt-chromium-platinum-hafnium oxides (CoCrPtHfO), cobalt-chromium-platinum-niobium oxides (CoCrPtNbO), cobalt-chromium-platinum-boron oxides (CoCrPtBO), cobalt-chromium-platinum-silicon oxides (CoCrPtSiO), cobalt-platinum-silicon nitrides (CoPtSiN), cobalt-platinum-tungsten nitrides (CoPtWN), cobalt-chromium-platinum-tantalum nitrides (CoCrPtTaN), cobalt-platinum-tantalum nitrides (CoPtTaN), and cobalt-chromium-platinum-silicon nitrides (CoCrPtSiN), wherein the hard magnetic recording layer comprises oxygen and/or nitrogen in a concentration of about 3 atomic % to about 40 atomic %, preferably in the range of about 5 atomic % to about 25 atomic %.

The soft, semi-soft or semi-hard magnetic recording layer preferably has an anisotropy that is lower than that of the hard magnetic recording layer, or preferably an anisotropy of about 6-12 kOe and a thickness of about 1-15 nm, and preferably comprises magnetically soft materials, and may include an iron alloy, a cobalt alloy, an iron and nickel alloy, an iron and nitrogen alloy, a tantalum and carbon alloy, Fe, Co, Ni, N, Ta, C, B, Si, Al, Zr, Nb, FeNi, FeN, FeTaC, FeTaN, FeCo, FeCoB, FeSiAl, CoZrNb, CoZrTa, an oxide, a nitride, cobalt-platinum oxide, a cobalt-chromium-platinum oxide, a cobalt-chromium-platinum-tantalum oxide, a cobalt-platinum-titanium oxide, a cobalt-chromium-platinum-titanium oxide, a cobalt-chromium-platinum-aluminum oxide, a cobalt-platinum-silicon oxide, a cobalt-chromium-platinum-zirconium oxide, a cobalt-chromium-platinum-hafnium oxide, a cobalt-chromium-platinum-niobium oxide, a cobalt-chromium-platinum-boron oxide, a cobalt-chromium-platinum-silicon oxide, a cobalt-platinum-silicon nitride, a cobalt-platinum-tungsten nitride, a cobalt-chromium-platinum-tantalum nitride, a cobalt-platinum-tantalum nitride, a cobalt-chromium-platinum-silicon nitride, or a combination thereof.

Applicable seed layer materials include tantalum (Ta), silver (Ag), copper (Cu), gold (Au), and platinum (Pt). The interlayer may include ruthenium (Ru), Ru alloys, such as RuCr, RuCoCr, and non-magnetic cobalt-chromium (CoCr) optionally having a third element selected from the group comprising Pt, molybdenum (Mo), Ta, Niobium (Nb), Boron (B), carbon (C), and Ru. The interlayer provides a crystalline seed layer for the subsequently deposited magnetic layer. A protective overcoat can be applied over the continuous magnetic layer, such as a carbon-containing protective overcoat, and a lubricant layer may be applied thereon. Preferably, a diamond carbon overcoat and lubricant are deposited on the surface of the top magnetic recording layer.

The following illustrate and describe some examples and more specific configurations, without limitation as to how description herein can be applied or to the appended claims.

Figure 2:
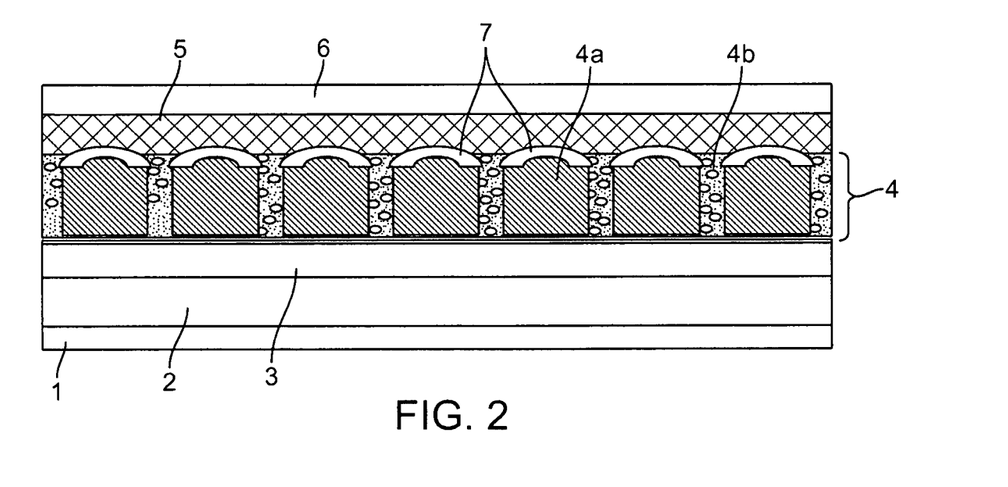
FIG. 2 depicts one embodiment of a magnetic recording medium comprising a stack of layers including an exchange tuning layer containing $CoCrRuTiO_2$ or $CoCrRuSiO_2$ below top magnetic recording layers comprising B or Pt and above a hard magnetic recording layer. The hard magnetic recording layer is preferably positioned over an interlayer, SUL and substrate. A carbon topcoat may also be deposited over the recording media hard layer in certain embodiments. Preferably, lubricant topcoat layer, preferably containing perfluoropolyether, is further deposited over the carbon topcoat.

FIG. 2 illustrates an example of a film structure of a magnetic recording media in accordance with one example. The substrate (1) can be any substrate that is suitable for magnetic recording media and preferably comprises a nickel-phosphorous plated aluminum or aluminum alloy, or a glass, ceramic, or glass-ceramic material. In one embodiment, a soft magnetic underlayer (SUL) (2) is sputtered onto the substrate. The underlayer preferably comprises chromium or a chromium alloy. The interlayer(s) (IL) (3) of one embodiment establishes a crystalline orientation base to induce the growth of hcp (for example, having a lattice structure with a {0002} growth orientation) in the subsequently deposited magnetic recording layers, with a magnetic easy axis perpendicular to the film plane. The IL (3) also establishes a template for segregation and preferably comprises a high surface roughness to induce grain separation in the subsequently deposited magnetic layers. The magnetic recording layers preferably comprise three or more layers, including a bottom hard magnetic layer (4) (which comprises grains 4a and boundaries 4b), an exchange tuning layer (7) (which is preferably granular) and a top magnetic layer recording layer (5) (having an anisotropy that is lower than that of the bottom hard magnetic layer), to optimize recording performance. Preferably, an overcoat (6) is deposited on the top magnetic layer (5) and comprises carbon.

The preferred compositions of the exchange tuning layer (7) include a Co-oxide-Ru layer, or $CoCr_{0-20}Ru_{2-25}(TiO_2)_{4-12}$ or $CoCr_{0-0}Ru_{2-40}(SiO_2)_{2-8}$. In certain embodiments, the exchange tuning layer (7) has low magnetization or is non-magnetic depending on composition. Preferably, the exchange tuning layer has a magnetic moment of about 200 memu/cc or less. The oxide contents in the exchange tuning layer (7) preferably provide a granular structure, which has less in-plane exchange coupling as compared with a continuous structure. This granular exchange tuning layer (7) preferably has good epitaxial growth on top of granular bottom magnetic layers and acts as a control layer between the magnetic properties of the bottom (4) and top (5) magnetic layers. The addition of Ru to the CoCr-oxide alloy modifies the crystal structure of the alloy, decreasing the ideal axial ratio (c/a) of atomic spacings, thereby increasing stacking fault energy and stabilizing the hcp e phase compared to the fcc a phase. In FIG. 2, the exchange tuning layer (7) is shown as being structured so as to cover the magnetic columnar grains (4a) of the hard layer, with spacing in the exchange tuning layer over the grain boundaries (4b) which preferably comprise voids, oxides, nitrides, non-magnetic materials, or combinations thereof. In other embodiments, the exchange tuning layer (7) may completely cover both the columnar grains (4a) as well as the grain boundaries (4b) of the hard layer (4).

Figure 3:
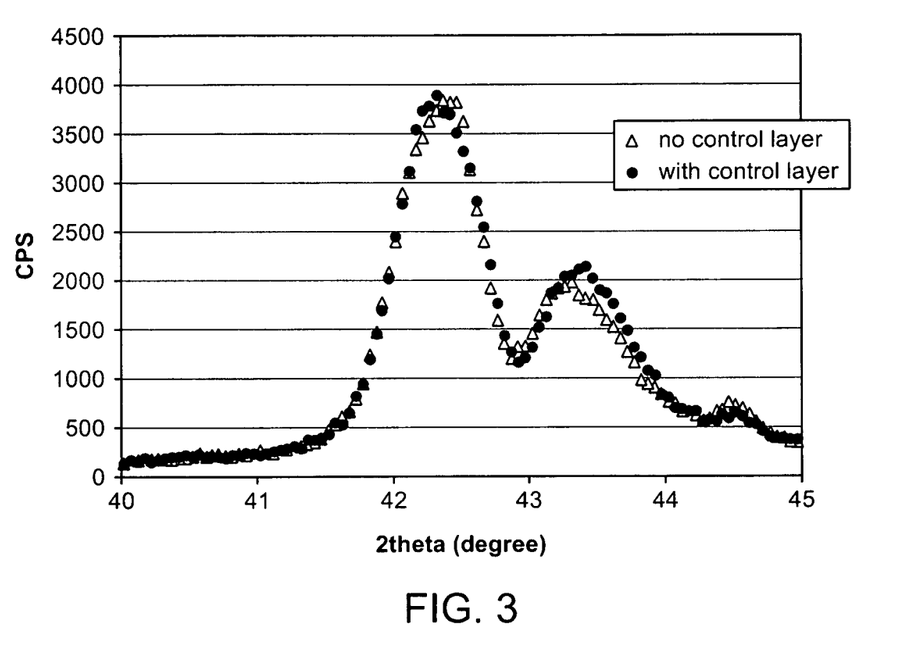
FIG. 3 shows results of an X-ray Diffraction spectra of media with versus without a 15 angstroms (Å) exchange tuning layer between the hard and soft/semi-soft/semi-hard magnetic recording layers according to one embodiment.

FIG. 3 shows the theta-2theta X-ray Diffraction (XRD) spectra of media with and without 15 Å exchange tuning layers. The Co peak around 43.3° from the medium with a 15 Å exchange tuning layer has higher intensity, indicating a more favorable epitaxial growth among the bottom magnetic, exchange tuning, and top magnetic recording layers.

Figure 4:
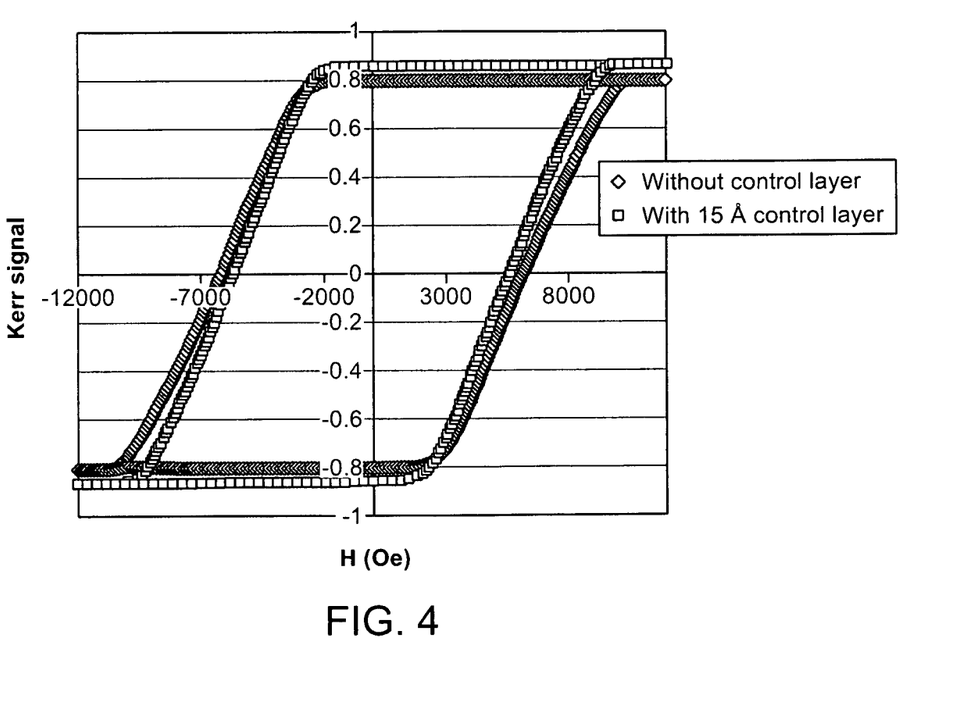
FIG. 4 shows Kerr loops of media with and without a 15 Å thick exchange tuning layer between the hard and soft/semi-soft/semi-hard magnetic recording layers, according to one embodiment of this invention.

FIG. 4 shows a measured Kerr loop of media with and without 15 Å exchange tuning layers. Magneto-Optical Kerr Effect (MOKE) magnetometry measures hysteresis loops of the media. Coercivity of a magnetic material is determined in this case by measurement of the hysteresis loop or magnetization curve. The apparatus used to acquire the data for the hysteresis measurement is typically a vibrating-sample or alternating-gradient magnetometer. The applied field where the data (called a magnetization curve) crosses zero is the coercivity. If an antiferromagnetic solid is present in the sample, the coercivities measured in increasing and decreasing fields may be unequal as a result of the exchange bias effect.

The lower $H_c$ and larger slope in the Kerr loop of medium with a 15 Å exchange tuning layer is related to the vertical exchange coupling between the bottom (hard and preferably comprising one or more granular layers) and top (soft, semi-soft or semi-hard and preferably comprising one or more continuous layers) magnetic layers, the improvement in epitaxial growth and the reduction in stacking faults. The medium with 15 Å exchange tuning layer has smaller SFD as compared to a medium without an exchange tuning layer.

Figure 5:
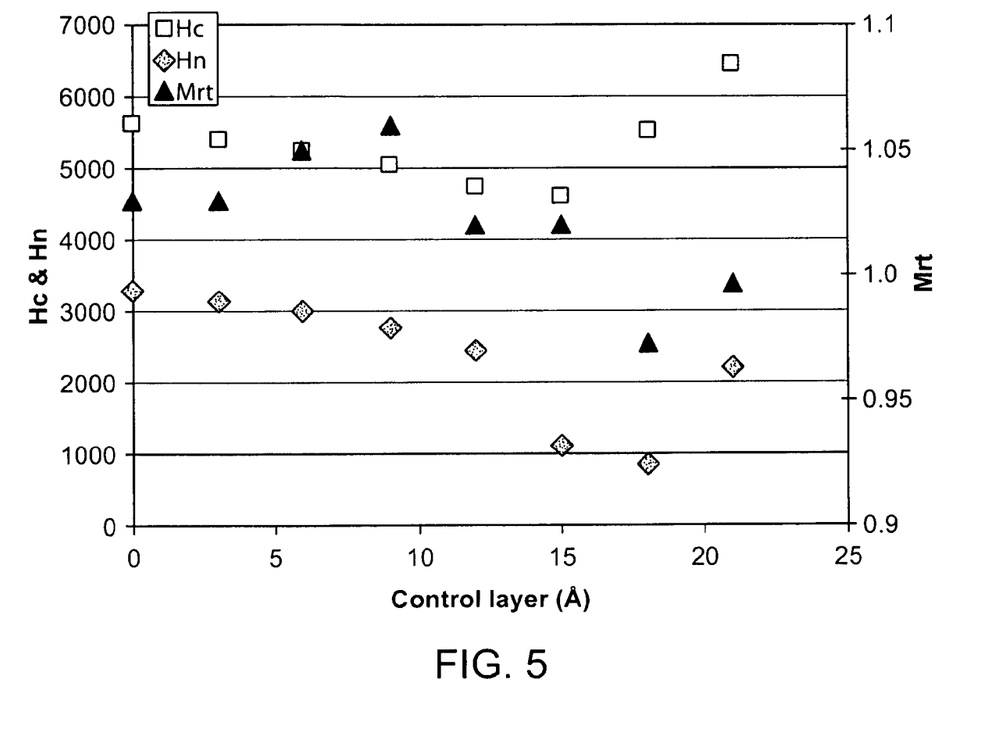
FIG. 5 shows HCR, HNR, and MRT responses as a function of an exchange tuning layer comprising $CoCrRuTiO_2$.

FIG. 5 shows the HCR, remanent nucleation field (Hnr) and remanence-thickness product (Mrt) (Mr multiplied by t) responses as a function of the exchange tuning layer thickness.

By varying exchange tuning layer thickness from about 0 to about 4 nm, vertical coupling is reduced from above optimal for reduction of HCR and writability to below optimal for reduction of HCR and writability.

In the example illustrated in FIG. 5, HCR is reduced significantly (from about 5700-5900 Oe to about 4000-4700 Oe) as the exchange tuning layer (control layer) increases from 0 to about 15 Å, due to a reduction of vertical coupling between the hard and lower anisotropy layers from a very strong coupling value towards a more optimal value. The remanent nucleation field also decreases (from about 3100-3500 Oe to about 1000 Oe or less) as the exchange tuning layer increases to an optimal thickness of about 15 Å. This optimal vertical exchange coupling leads to a significant reduction in closure field and thus improves media writability. As the exchange tuning layer (control layer) thickness increases beyond the optimal value (in this example, greater than about 15 Å) for this hard layer—lower anisotropy layer combination, vertical exchange becomes too weak, and HCR and closure field again increase. Writability correspondingly degrades as thickness increases past optimal value(s).

Figure 6:
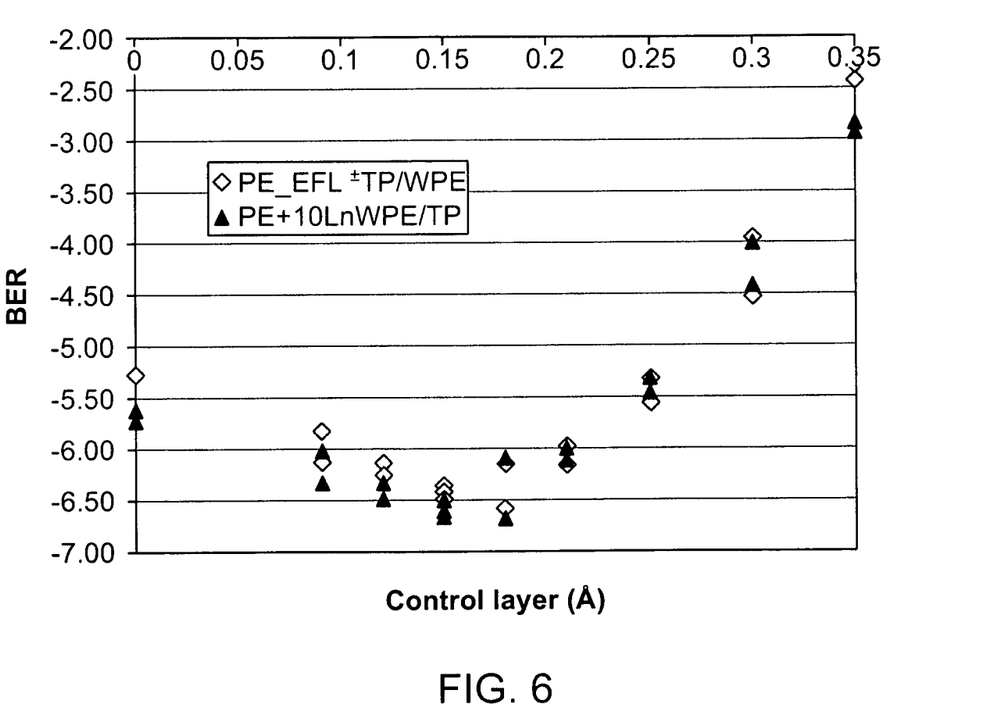
FIG. 6 shows normalized BER responses as a function of an exchange tuning layer comprising $CoCrRuTiO_2$.

FIG. 6 shows a normalized bit error rate (BER) response as a function of exchange tuning layer thickness. As compared to a medium without an exchange tuning layer, media with 12 to 15 Å thick exchange tuning layers show close to 1 decade BER gain. As compared to a continuous exchange tuning layer, the exchange tuning layer in this example is granular has about a 0.3-0.5 decade BER advantage. The BER gain comes from SFD reduction due to better epitaxial growth and less stacking faults, and improvement in writability without increase in in-plane exchange coupling.

Figure 7:
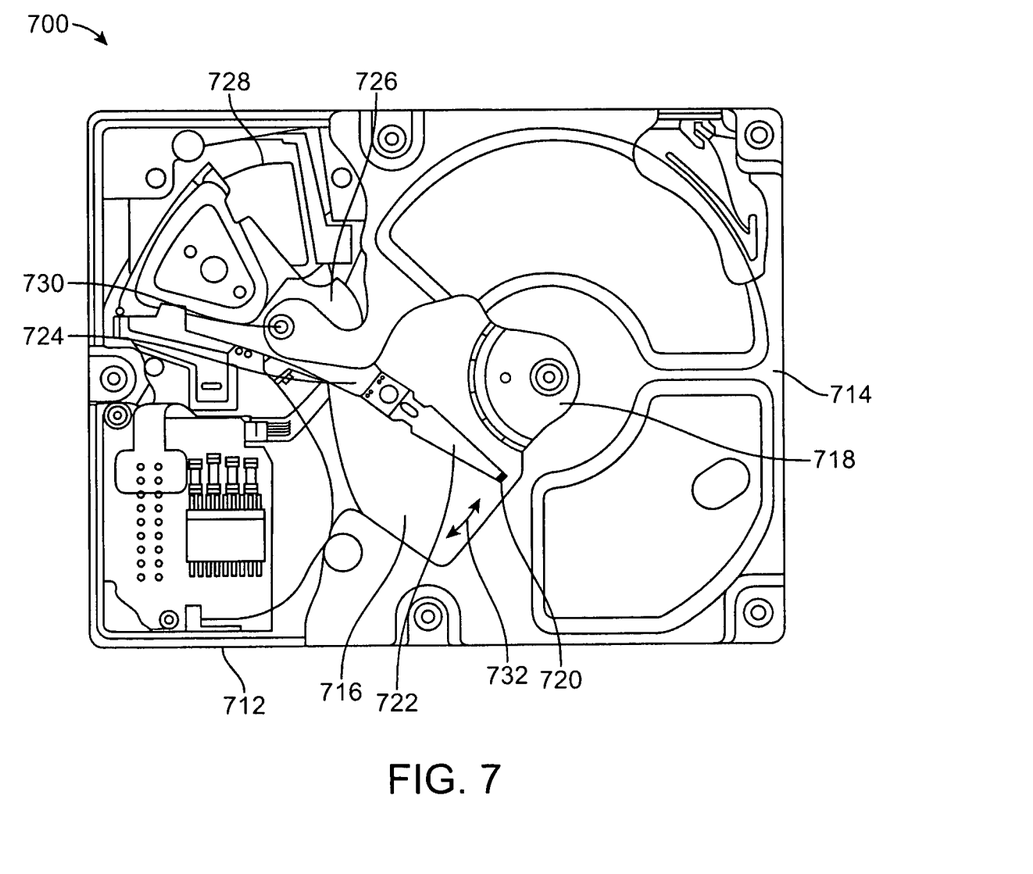
FIG. 7 shows a disk drive in which recording media according to the present description can be used.

FIG. 7 illustrates a disk drive 700 in which recording media according to the above description can be employed. The disk drive 700 includes a housing base 712 and a top cover plate 714. The housing base 712 is combined with cover plate 714 to form a sealed environment to protect the internal components from contamination by elements outside the sealed environment. The base and cover plate arrangement shown in FIG. 7 is well known in the industry; however, other arrangements of the housing components have frequently been used, and aspects of the invention are not limited by the particular configuration of the disk drive housing. Disk drive 700 further includes a disk pack 716 that is mounted on a hub for rotation on a spindle motor (not shown) by a disk clamp 718. Disk pack 716 includes one or more of individual disks that are mounted for co-rotation about a central axis. Each disk surface has an associated read/write head 720 that is mounted to the disk drive 700 for communicating with the disk surface. In the example shown in FIG. 7, read/write heads 720 are supported by flexures 722 that are in turn attached to head mounting arms 724 of an actuator 726. The actuator shown in FIG. 7 is of the type known as a rotary moving coil actuator and includes a voice coil motor, shown generally at 728. Voice coil motor 728 rotates actuator 726 with its attached read/ write heads 720 about a pivot shaft 730 to position read/write heads 720 over a desired data track along a path 732.

Figure 8:
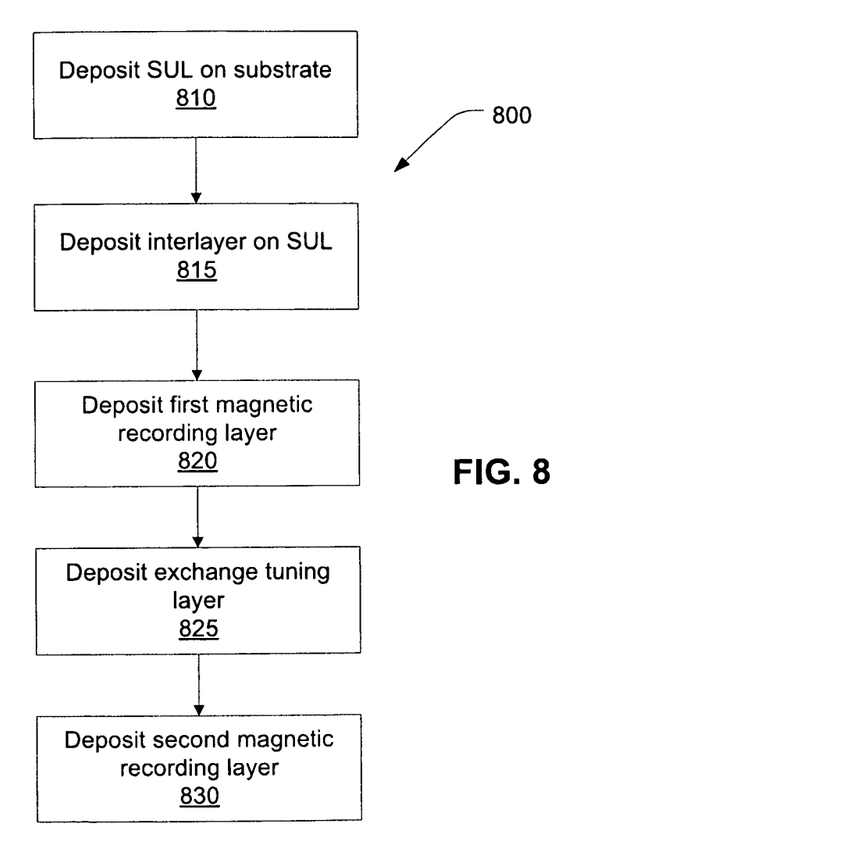
FIG. 8 illustrates steps of an example method of forming a recording media according to the present description.

FIG. 8 illustrates steps of an example method 800 in which recording media according to the above-described aspects can be formed. Method 800 includes depositing (810) an SUL on a substrate, depositing (815) an interlayer on the SUL, depositing (820) a first magnetic recording layer on the interlayer, depositing (825) an exchange tuning layer on the first magnetic recording layer, and depositing (830) a second magnetic recording layer on the exchange tuning layer.

Other embodiments and uses of the invention will be apparent to those skilled in the art from consideration of the specification and practice of the invention disclosed herein. Particular examples and other details are provided for illustrative and explanatory purposes, and not by way of limitation to the scope of the appended claims. The term comprising as used throughout this application includes the more limiting terms and phrases "consisting essentially of" and "consisting." To the extent that specific aspects of a given example above are consistent with specific aspects of a different example, those components may be useful together in other embodiments in accordance with the above-description.

We claim:

1. A magnetic recording medium comprising:
   a first magnetic recording layer having an anisotropy field of at least about 10 kOe;
   a second magnetic recording layer that is magnetically continuous and has an anisotropy field less than that of said first magnetic recording layer; and
   an exchange tuning layer that is a magnetically granular layer disposed between the first and second magnetic recording layers, the exchange tuning layer defining an array of magnetically decoupled spacings, the spacings aligned with magnetic grain boundaries of the first magnetic recording layer.

2. The magnetic recording medium of claim 1, the exchange tuning layer further comprising a hexagonally close packed (hcp) material, wherein the exchange tuning layer has a thickness of about 0.1-100 angstroms and a saturation magnetization ($M_s$) of about 0-300 emu/cc.

3. The magnetic recording medium of claim 2, wherein the hexagonally close packed (hcp) material comprises a cobalt containing alloy.

4. The magnetic recording medium of claim 2, wherein the exchange tuning layer includes Ruthenium.

5. The magnetic recording medium of claim 4, wherein the exchange tuning layer comprises one of $CoCr_{0-20}Ru_{2-25}(TiO_2)_{4-12}$ and $CoCr_{0-20}Ru_{2-40}(SiO_2)_{2-8}$.

6. The magnetic recording medium of claim 1, wherein the exchange tuning layer comprises an oxide material.

7. The magnetic recording medium of claim 1, wherein the medium has a smaller switching field distribution (SFD) as compared to a medium with no exchange tuning layer, and wherein the medium exhibits a remanent coercivity of about 3000-7000 Oe and a remanent nucleation field of about 1000 Oe.

8. The magnetic recording medium of claim 1, wherein the first magnetic recording layer comprises layers selected from the group consisting of a Co-alloy, a Pt-alloy, a Pd-alloy, an oxide, and combinations thereof.

9. The magnetic recording medium of claim 1, wherein the first magnetic recording layer and the exchange tuning layer have vertically continuous regions of oxide containing material.

10. The magnetic recording medium of claim 1, wherein the second magnetic recording layer comprises a lower concentration of platinum than does the first magnetic recording layer.

11. The magnetic recording medium of claim 1, further comprising a protective overcoat layer containing at least one of carbon and perfluoropolyether.

12. A magnetic recording medium comprising:
    a first magnetic recording layer having an anisotropy field of greater than 15 kOe;
    a second magnetic recording layer that is magnetically continuous and has an anisotropy field of about 6-12 kOe; and
    an exchange tuning layer that is a magnetically granular layer deposited between the first magnetic recording layer and the second magnetic recording layer, the exchange tuning layer defining an array of magnetically decoupled spacings, the spacings aligned with magnetic grain boundaries of the first magnetic recording layer, and the exchange tuning layer selected from the group consisting of a non-magnetic cobalt-oxide-ruthenium alloy, a ruthenium-oxide granular material, and a combination thereof.

13. The magnetic recording medium of claim 12 exhibiting a remanent coercivity of between about 3000 and 7000 Oe and a remanent nucleation field of about 1000 Oe.

14. The magnetic recording medium of claim 12, wherein one of the magnetic recording layers has a thickness of about 1-15 nanometers (nm) and the exchange tuning layer has a magnetic moment of about 200 emu/cc or less.

15. A method of manufacturing a magnetic recording medium, the method comprising:
    depositing a soft magnetic underlayer (SUL) on a substrate;
    depositing an interlayer on the SUL;
    depositing a first magnetic recording layer having an anisotropy field of about 10 kOe or more on the interlayer, the first magnetic recording layer including at least one granular magnetic layer;
    depositing an exchange tuning layer on the first magnetic recording layer, the exchange tuning layer having a thickness of about 0-50 angstroms and including at least one magnetically granular layer defining an array of magnetically decoupled spacings, the spacings aligned with magnetic grain boundaries of the first magnetic recording layer; and
    depositing a second magnetic recording layer on the exchange tuning layer, the second magnetic recording layer being magnetically continuous and having an anisotropy field that is less than the anisotropy of the first magnetic recording layer.

16. The method of claim 15, wherein increasing the thickness of the exchange tuning layer increases saturation magnetization ($M_s$) of said exchange tuning layer.

17. The method of claim 15, wherein the exchange tuning layer has a thickness of about 1-40 angstroms, and a saturation magnetization ($M_s$) of about 0-300 emu/cc.

18. The method of claim 15, wherein the exchange tuning layer reduces the switching field distribution (SFD) of the medium as compared to a medium with no exchange tuning layer and wherein the medium exhibits a remanent coercivity of about 3000-7000 Oe.

19. A magnetic recording medium manufactured by the method of claim 15.

20. A magnetic recording medium comprising:
    a first magnetic recording layer that is a magnetically granular layer having a first anisotropy field;

a second magnetic recording layer that is a magnetically continuous layer having a second anisotropy field that is less than the first anisotropy field; and an exchange tuning layer that is a magnetically granular layer disposed between the first and second magnetic recording layers, the exchange tuning layer defining an array of magnetically decoupled spacings, the spacings aligned with magnetic grain boundaries of the first magnetic recording layer.

* * * * *